(No Model.)
W. WEBSTER.
MACHINE FOR CENTERING, PREPARING, AND COUNTERSINKING BARS, STUDS, &c.
No. 505,013. Patented Sept. 12, 1893.
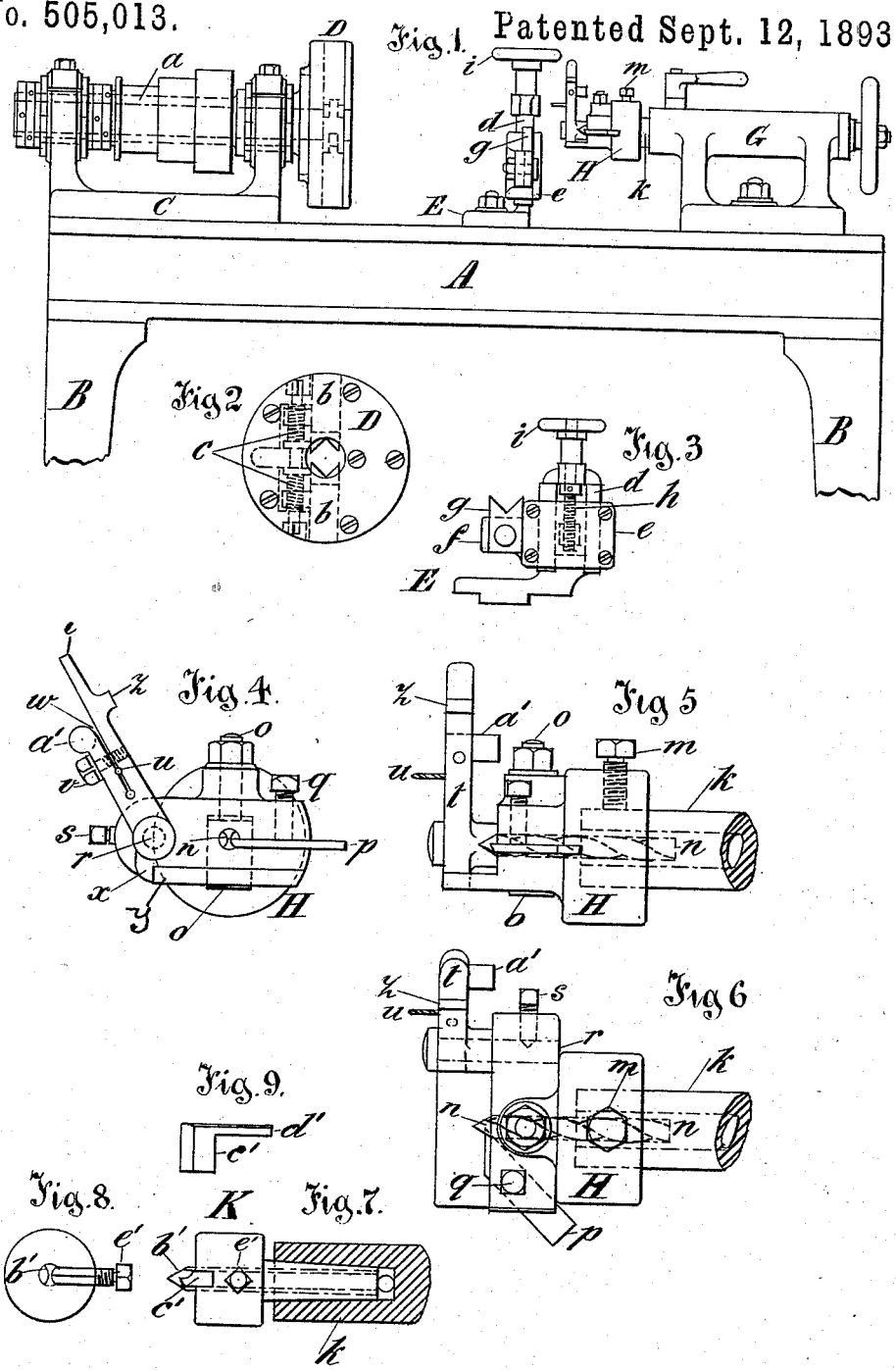
Witnesses.
Charles Ramsden
Robert Edwin Peacock Craven
Inventor.
William Webster
By Pattison & Nesbit
att'ys

UNITED STATES PATENT OFFICE.

WILLIAM WEBSTER, OF LEEDS, ENGLAND.

MACHINE FOR CENTERING, PREPARING, AND COUNTERSINKING BARS, STUDS, &c.

SPECIFICATION forming part of Letters Patent No. 505,013, dated September 12, 1893.

Application filed June 14, 1892. Serial No. 436,660. (No model.)

*To all whom it may concern:*

Be it known that I, WILLIAM WEBSTER, a subject of the Queen of Great Britain and Ireland, residing at Leeds, in the county of York, England, have invented new and useful Improvements in Machinery for Centering, Preparing, and Countersinking Bars, Studs, and Similar Articles Ready for Turning, of which the following is a specification.

My invention relates to improvements in machinery for centering, preparing and countersinking bars, studs and similar articles, previous to their being turned; more expeditiously, economically and in a superior manner than at present.

The objects of my invention are first, to fix the bars under treatment in a movable jawed chuck, on the end of a hollow rotating spindle of a fast headstock, secondly to cause the bar to be operated on to run truly, by means of a suitable rest, thirdly to drill the centers in the ends of such bars, studs and similar articles, by means of the point of a twist drill or a straight grooved, or spear shaped flat drill, and while the center is being drilled, to prepare or face the ends of such articles, by means of a fixed cutter; then to countersink the center by means of a smaller drill. I attain these objects by the mechanism illustrated in the accompanying drawings in which—

Figure 1. is a side elevation of the machine. Fig. 2. is a face view of a two jawed chuck. Fig. 3 is the front view of the steadying rest. Fig. 4 is the face view of the centering, preparing and countersinking chuck. Fig. 5. is the side elevation, and Fig. 6. is a plan of the same. Fig. 7 is a side elevation of a centering and facing chuck. Fig. 8. is a plan of same, while Fig. 9 is a plan of the facing cutter only.

Similar letters refer to similar parts throughout the several views.

The bed A. of the machine, is carried on feet B. which are only partially shown.

On the bed A. is mounted the fast headstock C. in which rotates the hollow spindle, a. on the end of which is the two jawed chuck D. the jaws b. being moved simultaneously to and from the center by the right and left hand screw c. a chuck with more jaws, moved simultaneously or separately may be used to grip and rotate the articles during the operations.

On the bed A. is also the rest E.

On the vertical slide d. is moved the carriage e. with the projecting arm f. carrying the steel V piece g. the carriage e. being actuated up and down by the screw h and hand wheel i.

Also on the bed A. is mounted the loose poppet head G.

On the end of the movable spindle k. is mounted the centering chuck H secured thereto by set screw m. In the center of the chuck H, is the main drill n. which is shown of the twist description, held in position by the lockbolt O. On one side of the body of this chuck, in a suitable groove is carried a facing cutter p. the cutting edge of which is a certain distance back from the front of the twist drill, and held in position by the set screw q. On the other side of the body of the chuck H is the stud r, held in position by set screw s. On the stud r, is mounted the movable arm t. so arranged as to grip the small drill u. by the gripping screw v. closing the slit w. This arm t. is shown in the back position, and is prevented going too far back by the heel piece x. resting against the end of the stop piece y; when the arm is turned over into position for drilling the rest z. then comes against the top of the stop piece y. and the piece, a'. touches the face of the body of the chuck H. The small drill u. is then in the same center line as the main drill n. and ready for countersinking the center. In some instances where it is not required to countersink the center, I use the chuck K which is mounted in the ordinary center of the spindle k. of the loose puppet head G. In the center of this chuck K is mounted a straight grooved drill b'. On one side of the grooved drill in a groove formed in the head of the chuck K is fitted a facing cutter c', having a shank d' provided on it, one side of this shank d' fitting in the hollow of the grooved drill b', the other side being rounded away to fit the inside of the hole in the chuck for the reception of the grooved drill b', the facing cutter c', and the grooved drill b', being held fast by the set screw e', pinching against the shank of the facing cutter c'.

In centering bars, studs, and similar articles

I fix one end of such articles in the jawed chuck, the other end being overhung. Then I cause the spindle to revolve by means of a belt on the cone fixed on the spindle and during the time the article is revolving I cause the slide e, on the rest E to approach such article and steady it until it revolves truly at the overhanging end. Then I cause the centering chuck to advance toward such overhanging end, the point of the main drill entering the overhung end and forming the center. By this time the preparing or end facing cutter begins to face the end of such article, and when such end is sufficiently faced, I then run the centering chuck back for a short distance, to enable me to bring into position the arm carrying the small countersinking drill. When this is done, I then advance again the centering chuck, so drilling the countersink hole the requisite depth. When this is done, I stop the machine, take out the article, and do the contrary end in the same way. Such article is then ready for turning.

When it is only necessary to center and face bars, and not to countersink them, I use a simple kind of chuck, as shown, in Figs. 7, 8, and 9, this being operated in a similar manner to the above described chuck.

I am aware that prior to my invention, head-stocks, with hollow spindles and having movable jawed chucks fixed on them; also loose puppet heads, have been made for rotating bars for boring and turning purposes, but not for the purpose of centering, preparing and countersinking. I therefore, do not claim such combinations broadly; but What I do claim as my invention, and desire to secure by Letters Patent, is—

1. A centering machine comprising a rotating hollow spindle carrying jaws, a drill support movable toward the said spindle carrying a drill, and a swinging arm carried by said drill support carrying a counter-sinking tool, substantially as specified.

2. A centering machine comprising a rotating hollow spindle carrying jaws, a drill support carrying a drill, and an arm pivoted to said support at one side of the drill and swinging transverse thereof, the said pivoted arm carrying a counter sinking tool, substantially as set forth.

Leeds, May 27, 1892.

WILLIAM WEBSTER.

In presence of—
CHARLES RAMSDEN,
ROBERT EDWIN PEACOCK CRAVEN,
*Leeds.*